United States Patent [19]

Kakinoki et al.

[11] Patent Number: 4,578,084

[45] Date of Patent: Mar. 25, 1986

[54] FIBER-TREATING METHOD AND COMPOSITION THEREFOR COMPRISING EPOXY-SILICONE AND ACRYLAMIDE RESIN

[75] Inventors: Hideo Kakinoki, Hino; Isao Ona, Sodegaura, both of Japan

[73] Assignee: Toray Silicone Co., Ltd., Tokyo, Japan

[21] Appl. No.: 651,387

[22] Filed: Sep. 17, 1984

[30] Foreign Application Priority Data

Oct. 28, 1983 [JP] Japan .................. 58-203395

[51] Int. Cl.$^4$ ............................................. D06M 1/00
[52] U.S. Cl. .................. 8/115.61; 8/115.51; 8/115.54; 252/8.8
[58] Field of Search ............. 428/391; 8/115.5, 115.6, 8/115.7, 115.51, 115.61; 252/8.8

[56] References Cited

U.S. PATENT DOCUMENTS 3,094,371 6/1963 Van Loo, Jr. et al. ............ 8/115.5
4,062,999 12/1977 Kondo et al. .................... 428/391
4,459,382 11/1984 Ona et al. ....................... 106/287.1

FOREIGN PATENT DOCUMENTS 17514 8/1973 Japan.
19715 1/1978 Japan.
98499 5/1978 Japan.
19716 8/1978 Japan.
36079 12/1978 Japan.

Primary Examiner—Paul Lieberman
Assistant Examiner—John F. McNally
Attorney, Agent, or Firm—George A. Grindahl

[57] ABSTRACT

Fiber materials having improved properties such as hand, lubricity, flexibility and creaseproofness, are provided by applying to the fiber material an aqueous composition which contains an epoxy group-containing organopolysiloxane and a water-soluble polyacrylamide resin and thereafter removing the water from the applied composition. Preferably the water is removed with sufficient heating to accelerate a crosslinking of the organopolysiloxane and the polyacrylamide resin. The resulting improved properties are durable to laundering and/or dry cleaning.

14 Claims, No Drawings

4,578,084

FIBER-TREATING METHOD AND COMPOSITION THEREFOR COMPRISING EPOXY-SILICONE AND ACRYLAMIDE RESIN

BACKGROUND OF THE INVENTION

This invention concerns fiber treatment. More specifically, it concerns a method and a composition which imparts to fiber materials and fiber products an appropriate slip and lubricity and a durable flexibility, smoothness, creaseproofness, compression recovery and stretch recovery. In order to provide fiber materials and fiber products with flexibility, smoothness, creaseproofness, recovery, etc., various treatment agents consisting of organopolysiloxanes or compositions thereof have conventionally been provided or proposed.

For example, it is known that a dimethylpolysiloxane oil or its emulsion impart flexibility. A treatment agent consisting of a methylhydrogenpolysiloxane, a hydroxyl-terminated dimethylpolysiloxane and a condensation reaction catalyst or treatment agent consisting of a methylhydrogenpolysiloxane, a vinyl-containing diorganopolysiloxane and an addition reaction catalyst, have been proposed for imparting durable flexibility creaseproofness and recovery. With regard to recent, practical agents, Japanese Pat. No. 48-17514 [73-17514] proposes a treatment agent consisting of an organopolysiloxane which contains at least two epoxy groups per molecule and an amino group-containing organopolysiloxane for imparting smoothness to synthetic organic fibers. Japanese Pat. No. 53-36079 [78-36079] proposes a treatment agent consisting of a hydroxyl-terminated diorganopolysiloxane, an organopolysiloxane which contains an amino group and an alkoxy group in each molecule and/or its partial hydrolyzate and condensate. Japanese Pat. Nos. 53-19715 [78-19715] and 53-19716 [78-19716] propose a treatment agent consisting of an aminoalkyltrialkoxysilane and an epoxy group-containing organopolysiloxane. Japanese Kokai Pat. No. 53-98499 [78-98499] proposes a triorganosiloxane-terminated diorganopolysiloxane containing at least two aminoalkyl groups per molecule. Moreover, mixtures of water-soluble polyacrylamide resins and aminoplast resins have been used in order to impart hardness to fiber materials and fiber products.

However, these known treatment agents suffer drawbacks. For example, the treatment agent using a dimethylpolysiloxane oil as the principal agent provides an inadequate creaseproofness and recovery and the flexibility and smoothness are not durable. Treatment agents using an alkoxysilane as an essential component suffer the following drawbacks: the alkoxysilane tends to hydrolyze during emulsification, the life of the process bath is too short and the hand is too stiff. Also, the heat treatment conditions must be rigorous or curing will be inadequate which makes it unsuitable for treating synthetic fiber products. The treatment agent employing a methylhydrogenpolysiloxane as an essential component suffers the drawback of inadequate curing in the absence of a catalyst while the use of a catalyst shortens the life of the process bath. Without an adequate heat treatment, the treatment agent employing an epoxy group-containing organopolysiloxane and an amino group-containing organopolysiloxane as the principal components will not provide durability while imparting too much slip, thus reducing the natural feel of natural fibers. Moreover, the mixture of polyacrylamide resin and aminoplast resin imparts a too stiff hand while lacking creaseproofness.

BRIEF SUMMARY OF THE INVENTION

In order to resolve the above drawbacks, the inventors conducted extensive research which resulted in the invention of the present fiber treatment agent and method which imparts to fiber materials an adequate slip and lubricity and, with a mild heat treatment, a durable flexibility, smoothness, creaseproofness, compression recovery and stretch recovery. The fiber treatment agent is characterized as being a crosslinkable mixture of an epoxy group-containing organopolysiloxane component (a) and a polyacrylamide resin component (b), typically applied as an aqueous composition. Component (a), when used alone, can only impart a nondurable flexibility and smoothness to fiber materials. Component (b) alone causes a rough hand and is readily lost in washing. However, with a mild heat treatment, the application of both components to a fiber material imparts an adequate slip and lubricity and a durable flexibility, smoothness, creaseproofness, compression recovery and stretch recovery. Durability refers here to a long-lasting effect after water washing or dry cleaning of a treated fiber material.

DETAILED DESCRIPTION OF THE INVENTION

In one aspect the present invention relates to an aqueous composition comprising a fiber-treating agent consisting of (a) 10 to 99.5 percent by weight, based on the weight of the fiber-treating agent, of an organopolysiloxane having an average of at least two epoxy group-containing, silicon-bonded organic groups per molecule, substantially all other organic groups of the organopolysiloxane being selected from the group consisting of monovalent hydrocarbon groups and halogenated monovalent hydrocarbon groups and (b) 0.5 to 90 percent by weight, based on the weight of the fiber-treating agent, of a water-soluble polyacrylamide resin.

Component (a) of the compositions of this invention is any epoxy group-containing organopolysiloxane. As long as at least two epoxy group-containing organic groups are present per molecule, no restrictions are placed on the molecular configuration and viscosity of the organopolysiloxane component (a). From the viewpoint of the effect from fiber treatment, the molecular configuration of component (a) is preferably linear, branched or cyclic, the compound is a fluid at room temperature and the viscosity is 50 to 100,000 cSt at 25° C. When this component is present in the composition as a latex, a high viscosity of about 100,000 cSt at 25° C. is preferred.

With R representing a monovalent hydrocarbon group and $R^2$ representing epoxy-containing organic groups, examples of the siloxane units comprising component (a), and having the well known siloxane bonding, are as follows: $R_3SiO_{1/2}$, $R_2R^2SiO_{1/2}$, $R_2SiO_{2/2}$, $RR^2SiO_{2/2}$, $RSiO_{3/2}$, $R^2SiO_{3/2}$ and $SiO_{4/2}$.

The silicon-bonded monovalent hydrocarbon groups (R) in component (a) are usually unsubstituted, but halogen-substituted R groups are also included in the definition of R groups. Examples of the silicon-bonded monovalent hydrocarbon groups (R) are alkyl groups such as methyl, ethyl, propyl and dodecyl; aryl groups such as phenyl, tolyl and phenylethyl; alkenyl groups such as vinyl and haloalkyl groups such as trifluoropropyl. All the monovalent hydrocarbon groups in one molecule need not necessarily be the same. Methyl is the most common selection from among the above groups. The combination of methyl and another monovalent hydrocarbon group, e.g., phenyl, long-chain alkyl or 3,3,3-trifluoropropyl, is also common.

The epoxy group-containing organic groups ($R^2$) are bonded to the silicon atom of the organopolysiloxane through a carbon-silicon bond. Typical groups are represented by the following formula

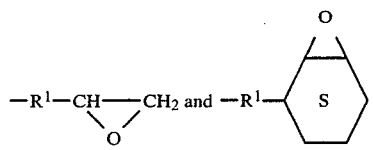

wherein $R^1$ is an arbitrary divalent organic group, e.g., methylene, ethylene, propylene, phenylene, hydroxylated hydrocarbon residues, chloroethylene, fluoroethylene, $-CH_2CH_2CH_2OCH_2-$, $-CH_2CH_2OCH_2CH_2-$, $-CH_2CH_2OCH(CH_3)CH_2-$ and $-CH_2OCH_2CH_2OCH_2CH_2-$.

The epoxy group-containing organic group may be located as a side chain group, as a terminal group or in a branch of the organopolysiloxane molecule. An average of at least two such organic groups must be present in each molecule to provide a fiber material treated therewith with a durable flexibility, smoothness, creaseproofness, recovery, etc. However, an excess of this group will cause the post-treatment hand to be too hard. Thus, for a soft hand, this group should preferably comprise 0.1 to 20 mol % and particularly 0.2 to 10 mol % of the total organic groups of component (a). In addition to the above monovalent hydrocarbon group and the epoxy-containing organic groups, small amounts of silanol groups, silicon-bonded alkoxy groups, silicon-bonded hydrogen atoms, etc., may also be present in component (a), although substantially all organic groups are R groups and $R^2$ groups.

A preferred organopolysiloxane component (a) has the formula $$Me_3SiO(Me_2SiO)_x(MeR^2SiO)_ySiMe_3$$

wherein Me denotes a methyl group and x and y denote numbers whose average values are each at least two.

Component (a) can be readily produced, for example, by the methods described in U.S. Pat. No. 2,970,150 which is incorporated herein by reference. Since component (a) is generally not water soluble, it is preferably used for fiber treatment in the form of an emulsion or latex. Examples of emulsifiers for this purpose are the salts of sulfate esters of high alcohols, alkylbenzenesulfonates, polyoxyalkylene adducts with higher alcohols, polyoxyalkylene adducts with higher aliphatic acids, polyoxyalkylene adducts with alkylphenols, higher aliphatic acid sorbitan esters, etc.

The polyacrylamide resin component (b) can be derived either from the homopolymerization of acrylamide monomer ($CH_2=CHCONH_2$) or from the copolymerization of acrylamide monomer and another vinyl monomer present in relatively small molar quantities. The molecular weight of the polyacrylamide resin is generally 500,000 to 10,000,000 and it is water-soluble at room temperature. The polyacrylamide resin may be used either as a polymer containing

or, after the partial alkaline hydrolysis of part of the amide groups to carboxyl groups, as a polymer containing

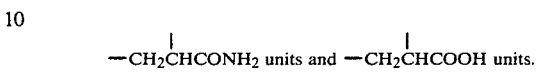

Treatment of a fiber material by only the polyacrylamide resin component (b) produces a rough product with an extremely poor creaseproofness and hand and a significantly reduced lubrication. When used in combination with the organopolysiloxane component (a), a significant effect from treatment of a fiber material is observed and the durability of the effect is significantly improved. This is presumably attributed to a ring-opening addition reaction between the epoxy group of component (a) and the amino group of component (b) which crosslinks component (a) and component (b). It is generally preferable that component (b) take the form of an aqueous solution in the fiber treatment method of this invention.

The compounding ratio of component (a) and component (b) is 90 to 0.5 wt % component (b) relative to 10 to 99.5 wt % component (a). Less than 10 wt % component (a) causes an inadequate flexibility, smoothness and lubricity. More than 99.5 wt % component (a) causes an excessive slip. Accordingly, 70 to 5 wt % component (b) relative to 30 to 95 wt % component (a) is preferred.

The compositions of this invention can be prepared by any suitable method, as noted below for the second aspect of this invention; however, they are best prepared by forming an oil-in-water emulsion comprising component (a) and an aqueous solution comprising component (b) and thereafter mixing the two aqueous compositions, and any other desirable components, to form the aqueous compositions of this invention.

The compositions of this invention are useful as fiber-treating compositions and as coating compositions.

In a second aspect the present invention thus relates to a method for durably improving one or more fiber material properties selected from the group consisting of hand, lubricity, flexibility and creaseproofness, said method comprising (I) providing on a fiber material an amount of an aqueous composition comprising a fiber-treating agent consisting of (a) 10 to 99.5 percent by weight, based on the weight of the fiber-treating agent, of an organopolysiloxane having an average of at least two epoxy group-containing, silicon-bonded organic groups per molecule, substantially all other organic groups of the organopolysiloxane being selected from the group consisting of monovalent hydrocarbon groups and halogenated monovalent hydrocarbon groups and (b) 0.5 to 90 percent by weight, based on the weight of the fiber-treating agent, of a water-soluble polyacrylamide resin, said amount being sufficient to adhere to the fiber material from 0.1 to 10 percent by weight, based on the weight of the fiber material, of component (a) plus component (b), (II) removing substantially all of the water from the aqueous composition on the fiber material, and optionally, thereafter (III) heating the fiber material sufficiently to accelerate a crosslinking reaction between component (a) and component (b) thereon.

In the method of this invention the aqueous composition that is provided on a fiber material is the aqueous composition of this invention, including preferred embodiments thereof, delineated above.

With regard to providing this fiber treatment agent onto fiber materials and fiber products, component (a) may be emulsified in the presence of component (b) and the resulting composition, including any additional optional components, may then be applied to the fiber material or fiber product. Alternatively, component (a) may be emulsified and then mixed with component (b) in aqueous solution form, and any other optional components, and this then adhered to the fiber material or fiber product. Moreover, it is also possible first to adhere an emulsion of component (a) to the fiber material or fiber product and then to adhere the aqueous solution of component (b) or this order may be reversed. In this latter procedure optional components can be added to component (a) and/or to component (b). Any treatment method by which these two components are simultaneously present on the fiber material or fiber product is essentially acceptable and encompassed by the word providing. From the viewpoint of a uniform treatment effect, it is preferable to mix components (a) and (b), and any other optional components, in advance of the treatment of the fiber material or fiber product. Generally, 0.1 to 10 wt %, based on the weight of fiber material or product, of the combined components (a) and (b) is adhered on the fiber material or fiber product.

After water has been removed by standing at room temperature, blowing on hot air or heating, the treated fiber material or fiber product may be heated as necessary to accelerate the crosslinking reaction between component (a) and component (b) and obtain a durable flexibility, smoothness, creaseproofness, compression recovery and rebound. The slip and lubricity are also satisfactory. Hot air ventilation or a heat treatment are preferred over standing at room temperature from the standpoints of an increased productivity and durability.

If necessary, appropriate amounts of a curing catalyst, e.g., amine or alkali, may be added to the fiber treatment agent. Moreover, conventionally known additives such as antistatics, softeners, creaseproofers, heat-stabilizers, flame retardants, aminoplast resins, etc., may also be applied simultaneously.

Examples of the fiber materials and fiber products to be treated by the method of this invention are natural fiber such as wool, silk, flax, cotton and asbestos; regenerated fiber such as rayon and acetate; synthetic fiber such as polyester, polyamide, vinylon, polyacrylonitrile, polyethylene, polypropylene and spandex; glass fiber, carbon fiber; silicon carbide fiber, etc. Examples of the physical form are staple, filament, tow, yarn, weaves, knits, nonwovens, resin-processed fabrics, synthetic leather, etc. Knits, nonwovens, Japanese mattress cotton, etc., may be effectively subjected to continuous treatment in sheet form.

Examples of this invention and comparison examples are given below. In the examples and comparison examples, "parts" and "%" denote "parts by weight" and "wt %" respectively. The viscosity was measured at 25° C.

The following tests were used, as noted in the following examples, to evaluate the compositions and method of this invention.

Laundry conditions: Automatic reversing washing machine, 0.5% aqueous Marseille soap solution, 10 minutes wash at "high" and 5 minutes rinse comprise 1 cycle, 5 cycles total.

Flexibility: JISL-1096 (1979) General Textile Experimental Methods. 6.19. Rigidity/Flexibility, 6.19.1. Method A (45° cantilever method) was used to measure the extrusion length (mm).

Hand: based on sensation to the hand.

Residual organopolysiloxane (%): The residue was calculated from the counts before and after washing using an X-ray fluorescence analyzer.

Creaseproofness: The creaseproofness was measured by JISL-1096, Test Methods for General Weaves, 6.22 Creaseproofness, Method B (Monsanto method).

EXAMPLE 1

Thirty parts of an epoxy group-containing organopolysiloxane with the following formula

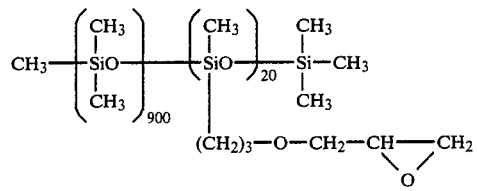

and a viscosity of 18,100 cSt, a total of 5 parts of 3 different species of polyoxyethylene octylphenol ethers with an HLB between 10 and 13 and 67 parts water were combined in an emulsifier apparatus to prepare a stable emulsion. This emulsion, Sumitex Resin A-1 (11% active polyacrylamide resin in water from Sumitomo Kagaku Co., Ltd., Osaka, Japan) and water were used to prepare the four treatment baths shown in Table 1a. 100% silk plain weave suit cloth was dipped in the treatment bath for 1 minute. The total adhesion of component (a) and component (b) was wrung out to 0.5%, 1%, 2%, or 3% using a mangle. Various properties were evaluated after drying and heat treating the treated cloth with a hot air drier at 60° to 80° C. for 20 minutes and at 120° C. for 20 minutes, respectively.

The results of the flexibility evaluation is shown in Table 1b. The 100% silk plain weave suit cloth treated by treatment bath A or B of this invention had a far superior flexibility while the hand of silk was almost completely retained. The volume feel and rebound were also superior. These properties were retained even after 5 washings.

TABLE 1a

| Bath Designator | Siloxane Emulsion, Parts | Resin Solution, Parts | Water, Parts |
|---|---|---|---|
| A | 10 | 2 | 200 |
| B | 10 | 6 | 200 |
| C* | 10 | 0 | 200 |
| D* | 0 | 10 | 200 |

*Not this invention. Comparison only.

TABLE 1b

| Bath Designator | Treatment Level, % | Flexiblity, mm. | |
|---|---|---|---|
| | | Initial | After 5 washes |
| A | 0.5 | 3.6 | 3.8 |
| | 1 (84%)** | 3.6 | 3.6 |

TABLE 1b-continued

| Bath Designator | Treatment Level, % | Flexiblity, mm. Initial | Flexibility, mm. After 5 washes |
| --- | --- | --- | --- |
|  | 2 | 3.6 | 3.6 |
|  | 3 | 3.8 | 3.6 |
| B | 0.5 | 4.5 | 4.4 |
|  | 1 (89%)** | 4.2 | 4.3 |
|  | 2 | 4.2 | 4.3 |
|  | 3 | 4.2 | 4.3 |
| C* | 0.5 | 3.4 | 4.7 |
|  | 1 (33%)** | 3.4 | 4.8 |
|  | 2 | 3.4 | 4.5 |
|  | 3 | 3.4 | 4.3 |
| D* | 0.5 | 6.8 | 6.2 |
|  | 1 (0%)** | 7.3 | 6.5 |
|  | 2 | 7.7 | 7.2 |
|  | 3 | 8.6 | 7.5 |
| None | 0 | 6.2 | 5.7 |

*Not this invention. Comparison only.
**Residual organopolysiloxane after 5 washes.

With respect to hand evaluation, the untreated control was found to have a good, silk hand; however, the cloth lacked rebound as a suit cloth and wrinkled readily. This hand did not change noticeably during five washes.

The cloth treated by the methods of this invention (baths A and B) at the 1% treatment level had a good, silk hand and good rebound and was suitable as a suit cloth. This hand did not change noticeably during five washes.

The cloth treated by the comparison methods (baths C and D) at the 1% treatment level was inferior in that the cloth produced by bath C had excessive slip and smoothness and was not suitable as a suit cloth although the hand was good; and the cloth produced by bath D had a hand which was too hard, it lacked firmness and was unsuitable as a suit cloth. After 5 washes, the excessively slippery cloth was still excessively slippery and the hard-handed cloth was too wrinkled and rough.

EXAMPLE 2

Example 1 was repeated, except the epoxy group-containing organopolysiloxane had a viscosity of 8300 cSt and the following formula:

$$C_6H_5(\underset{\underset{CH_3}{|}}{\overset{\overset{CH_3}{|}}{Si}}O)_{600}(\underset{\underset{CH_2}{|}}{\overset{\overset{CH_3}{|}}{Si}}O)_{10}SiC_6H_5$$
$$\underset{CH_2}{|}$$

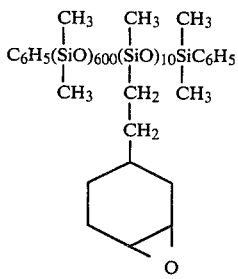

Treatment baths E, F, G and H, analogous to treatment baths A, B, C and D, respectively, were prepared and the suit cloth of Example 1 was treated using these treatment baths. The hand and residual organopolysiloxane of the treated material were evaluated as in Example 1.

The results of the evaluation are reported in Table 2. The 100% silk weave treated by treatment baths E or F of this invention did not lose the hand of a 100% silk weave suit cloth and the creaseproofness was good.

TABLE 2

| Bath Designator | Treatment Level, % | Creaseproofness Initial | Creaseproofness After 5 washes |
| --- | --- | --- | --- |
| E | 0.5 | 151.0 | 142.0 |
|  | 1 (83%)** | 150.0 | 143.5 |
|  | 2 | 151.0 | 143.5 |
|  | 3 | 150.5 | 144.0 |
| F | 0.5 | 142.5 | 132.0 |
|  | 1 (77%)** | 143.0 | 132.5 |
|  | 2 | 142.5 | 132.0 |
|  | 3 | 138.5 | 129.0 |
| G* | 0.5 | 149.5 | 125.0 |
|  | 1 (29%)** | 147.5 | 120.5 |
|  | 2 | 147.0 | 119.5 |
|  | 3 | 148.0 | 119.5 |
| H* | 0.5 | 110.0 | 99.5 |
|  | 1 (0%)** | 103.5 | 93.5 |
|  | 2 | 98.5 | 89.0 |
|  | 3 | 93.5 | 85.5 |
| None | 0 | 115.0 | 105.0 |

*Not this invention. Comparison only.
**Residual organopolysiloxane after 5 washes.

With respect to hand evaluation, the treatment baths of this example produced substantially the same results as the analogous treatment baths of Example 1.

EXAMPLE 3

10 parts of the organopolysiloxane emulsion of Example 1, 27.3 parts of Sumitex Resin A-1 SPE (aqueous solution of a water-soluble polyacrylamide resin as component (b) containing the

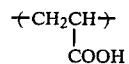

unit in the molecule, anionic, 11% effective component, by Sumitomo Kagaku Co., Ltd.) and 200 parts of water were mixed to prepare a treatment bath having approximately equal amounts of organopolysiloxane and polyacrylamide resin. 100% cotton broadcloth and a 100% polyester textured yarn weave were dipped into this treatment bath and wrung out with a mangle to 1% total adhered components (a) and (b). After drying at 60° to 80° C. in a hot air drier for 20 minutes, these were heat-treated at 150° C. in a hot air drier for 10 minutes. The treated cloth was then washed 3 times as in Example 1. Both the 100% cotton weave and the 100% polyester textured yarn weave presented good creaseproofness and an excellent hand with no deterioration due to washing. The significant effect of the treatment agent of this invention was thus further verified.

EXAMPLE 4

100% spun polyester sewing thread was treated by treatment bath B from Example 1 (with the modification that 100 parts water were compounded). The total adhered amount of components (a) and (b) was wrung out to 5% using a mangle followed by drying at 60 to 80° C. and then heat treating at 140° C. in a hot air drier for 15 minutes. Four pieces of 65%/35% polyester/cotton broadcloth were stacked up and sewn using this thread and an industrial sewing machine to investigate the thread's sewability. No yarn breakage was observed and the lubricity was excellent.

The sewed product was then washed 3 times under the same conditions as in Example 1 and then spread out flat at room temperature to dry in order to investigate puckering. No puckering was observed which confirmed that the treatment agent of this invention is also an excellent treatment agent for sewing thread.

That which is claimed is:

1. An aqueous composition comprising a fiber-treating agent consisting of
(a) 10 to 99.5 percent by weight, based on the weight of the fiber-treating agent, of an organopolysiloxane having an average of at least two epoxy group-containing, silicon-bonded organic groups per molecule, substantially all other organic groups of the organopolysiloxane being selected from the group consisting of monovalent hydrocarbon groups and halogenated monovalent hydrocarbon groups and
(b) 0.5 to 90 percent by weight, based on the weight of the fiber-treating agent, of a water-soluble polyacrylamide resin.

2. A composition according to claim 1 wherein the organopolysiloxane is a fluid having a viscosity of from 50 to 100,000 centistokes at 25° C. and has a substantially linear molecular structure.

3. A composition according to claim 2 wherein the linear organopolysiloxane fluid has the formula $Me_3Si-O(Me_2SiO)_x(R^2MeSiO)_ySiMe_3$ wherein Me denotes a methyl group, $R^2$ denotes the epoxy group-containing, silicon-bonded organic group and x and y denote numbers, each independently having average values of 2 or more.

4. A composition according to claim 3 wherein $R^2$ is selected from the group consisting of

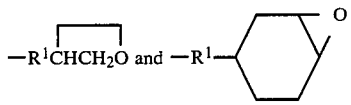

wherein $R^1$ denotes an organic group, the undesignated valence of which is bonded to silicon by way of a silicon-carbon bond.

5. A composition according to claim 2 wherein component (a) is present as an aqueous emulsion and component (b) is present as an aqueous solution.

6. A composition according to claim 1 wherein component (b) is a water-soluble polyacrylamide resin consisting essentially of units having the formula

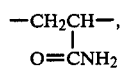

and optionally, units having the formula

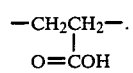

7. A composition according to claim 4 wherein component (b) is a water-soluble polyacrylamide resin consisting essentially of units having the formula

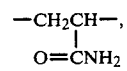

and optionally, units having the formula

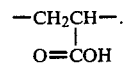

8. A composition according to claim 7 wherein component (a) is present as an aqueous emulsion and component (b) is present as an aqueous solution.

9. A method for durably improving one or more fiber material properties selected from the group consisting of hand, lubricity, flexibility and creaseproofness, said method comprising the steps of
(I) providing on a fiber material an amount of an aqueous composition comprising a fiber-treating agent consisting of (a) 10 to 99.5 percent by weight, based on the weight of the fiber-treating agent, of an organopolysiloxane having an average of at least two epoxy group-containing, silicon-bonded organic groups per molecule, substantially all other organic groups of the organopolysiloxane being selected from the group consisting of monovalent hydrocarbon groups and halogenated monovalent hydrocarbon groups and (b) 0.5 to 90 percent by weight, based on the weight of the fiber-treating agent, of a water-soluble polyacrylamide resin, said amount being sufficient to adhere to the fiber material from 0.1 to 10 percent by weight, based on the weight of the fiber material, of component (a) plus component (b),
(II) removing substantially all of the water from the aqueous composition on the fiber material, and optionally, thereafter
(III) heating the fiber material sufficiently to accelerate a crosslinking reaction between component (a) and component (b) thereon.

10. A method according to claim 9 wherein said water removal is aided by a process comprising heating the aqueous composition on the fiber material.

11. A method according to claim 10 wherein the organopolysiloxane is a fluid having a viscosity of from 50 to 100,000 centistokes at 25° C. and has a substantially linear molecular structure.

12. A method according to claim 11 wherein the water-soluble polyacrylamide resin consists essentially of units having the formula

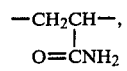

and optionally, units having the formula

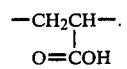

13. A method according to claim 12 wherein component (a) is provided as an aqueous emulsion and component (b) is provided as an aqueous solution.

14. A method according to claim 9 wherein said providing is done by preparing the aqueous composition comprising a fiber-treating agent and subsequently applying the aqueous composition to the fiber material.

* * * * *